(12) United States Patent
Callum

(10) Patent No.: US 6,985,581 B1
(45) Date of Patent: Jan. 10, 2006

(54) METHOD AND APPARATUS TO VERIFY CIRCUIT OPERATING CONDITIONS

(75) Inventor: Roy Callum, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/306,227

(22) Filed: May 6, 1999

(51) Int. Cl.
  *H04F 1/00* (2006.01)
  *H04F 3/00* (2006.01)
  *G06F 1/06* (2006.01)
  *G06F 11/30* (2006.01)

(52) U.S. Cl. .............................. 380/2; 380/1; 713/194; 713/501; 714/37

(58) Field of Classification Search ............... 380/1, 380/2, 59; 713/189, 194, 500–503; 235/375–377, 235/419, 431; 714/37, 45, 48, 55, 24
See application file for complete search history.

(56) References Cited

U.S. PATENT DOCUMENTS

| | | | | |
|---|---|---|---|---|
| 4,855,581 A | * | 8/1989 | Mertel et al. | 235/462 |
| 4,962,352 A | * | 10/1990 | Ogawa | 324/73.1 |
| 5,432,848 A | * | 7/1995 | Butter et al. | 380/2 |
| 5,608,798 A | * | 3/1997 | Likens et al. | 380/2 |
| 5,671,284 A | * | 9/1997 | Buer | 380/29 |
| 5,844,823 A | * | 12/1998 | Mishra | 364/578 |
| 5,870,469 A | * | 2/1999 | Albert et al. | 380/4 |
| 5,925,144 A | * | 7/1999 | Sebaa | 714/733 |
| 6,101,254 A | * | 8/2000 | Thiriet | 380/2 |
| 6,219,420 B1 | * | 4/2001 | Hardy et al. | 380/2 |
| 6,330,668 B1 | * | 12/2001 | Curiger et al. | 713/1 |

OTHER PUBLICATIONS

Menezes et al, "Handbook of Applied Cryptography" 1997, CRC Press Inc, p. 250–259.*
Schneier "Applied Cryptography" 1996, John Wiley & Sons Inc, $2^{nd}$ Edition, p. 265–301.*
Wang et al., "On the Hardware Design for DES Cipher in Tamper Resistant Devices against Differential Fault Analysis" May 2000, IEEE International Symposium on Circuits and Systems, pp. 1–4.*

* cited by examiner

*Primary Examiner*—Christopher Revak
(74) *Attorney, Agent, or Firm*—Rob D. Anderson

(57) ABSTRACT

A circuit includes an operation unit adapted to perform a circuit operation in a plurality of rounds. The operation unit may operate properly under a predetermined range of operating conditions. The operation unit is adapted to select between receiving an input signal and a test signal and to perform a test round of the circuit operation when the test signal is selected. The circuit is adapted to compare a reference value with a result of the test round, the reference value identifying a correct value for the result of the test round when the operation unit is operating under the predetermined range of operating conditions. The operation unit is further adapted to receive a disable signal to disable the operation unit from performing the circuit operation when the result of the test round does not match the reference value. Other embodiments are described and claimed.

15 Claims, 5 Drawing Sheets

| SELECT TEST DATA VALUE FOR INPUT TO DES UNIT 410 | SELECT TEST KEY VALUE FOR INPUT TO DES IUNIT 420 | PROCESS N ROUNDS DES OPERATION 430 | STORE TEST RESULT IN REGISTER 440 | | CLOCK |
|---|---|---|---|---|---|
| COMPARE TEST RESULT WITH REFERENCE VALUE 450 | OUTPUT INDICATION OF EQUALITY OF TEST RESULT AND REFERENCE VALUE 460 | SELECT DATA VALUE FOR INPUT TO DES UNIT 470 | SELECT KEY VALUE FOR INPUT TO DES UNIT 480 | PROCESS N ROUNDS DES OPERATION 490 | CLOCK |
| SELECT TEST DATA VALUE FOR INPUT TO DES UNIT 415 | SELECT TEST KEY VALUE FOR INPUT TO DES IUNIT 425 | PROCESS N ROUNDS DES OPERATION 435 | | | CLOCK |

| COMPUTE COUNT CORRESPONDING TO CLOCK PERIOD 510 | STORE COUNT IN REFERENCE REGISTER 520 | | CLOCK 0 |
|---|---|---|---|
| COMPUTE COUNT CORRESPONDING TO CLOCK PERIOD 530 | SUBTRACT COUNT FROM VALUE IN REFERENCE REGISTER 540 | COMPARE ABSOLUTE DIFFERENCE WITH LIMIT VALUE 550 | OUTPUT INDICATION OF WHETHER CLOCK PERIOD IS OUTSIDE LIMITS 560 | CLOCK 1 |

METHOD AND APPARATUS TO VERIFY CIRCUIT OPERATING CONDITIONS

BACKGROUND

1. Field

The present invention relates to the field of data verification, and more particularly to verification of the operating conditions of electronic circuits.

2. Background Information

In the modern world, large amounts of information are manipulated and transmitted electronically. Unfortunately, electronic information may be vulnerable to manipulation, tampering, or intrusion by unauthorized third parties. To prevent such unwanted activity, electronic data may be processed in ways which make its contents less vulnerable to intrusion or tampering.

For example, electronic data may be encoded in order to make the contents unrecognizable from its original form. To reduce the risk of unauthorized tampering, the data may be "signed" with a digital signature. Digital signatures may involve the generation and encryption of a unique hash value representing the information, in various manners well known in the art.

Such data operations may be performed using hardware circuits. Use of hardware circuits may increase the speed of such data operations as compared with the use of software executed on a general purpose processor for the same purpose. Hardware circuits may also provide an added security benefit by making it more difficult for unauthorized parties to inspect the logic inherent within the operation.

Unfortunately, unauthorized third parties may attempt to alter the results produced by hardware circuits in an attempt to ascertain the logic within the circuits. One approach involves the intentional variation of the predetermined operating conditions (voltage, temperature, clock frequency, etc.) of the circuit in order to cause the circuit to output intermediate operation results. For example, a third party may increase the frequency of the clock signal applied to the circuit beyond the maximum predetermined operating frequency of the circuit, which may cause the circuit to output intermediate results of the circuit's operation. Other circuit conditions which may be altered include the operating voltage and operating temperature. An increase in the circuit temperature or a decrease in the operating voltage beyond the circuit's operational limits may cause the circuit to output intermediate results.

Consider a hardware circuit implementing the Digital Encryption Standard: 1977 (DES) operation. A complete DES operation may comprise sixteen rounds (iterations) of processing, each subsequent round inputting and operating on the results of the previous round. A synchronous hardware circuit implementing the DES operation may implement multiple rounds (n rounds) of processing per clock cycle. The intermediate result of each n rounds is provided as an input signal for processing during a subsequent clock cycle. After sixteen rounds of processing, the circuit outputs a final result of the DES operation. However, by altering the operating conditions of the circuit it may be possible to cause the circuit to output a final result which represents, for example, only eight rounds of processing. This intermediate result may yield clues about the details of the DES operation which may not be as readily available from the sixteen-round final output of the circuit.

SUMMARY

A circuit includes an operation unit adapted to perform a circuit operation in a plurality of rounds. The operation unit may operate properly under a predetermined range of operating conditions. The operation unit is adapted to select between receiving an input signal and a test signal and to perform a test round of the circuit operation when the test signal is selected.

The circuit is adapted to compare a reference value with a result of the test round, the reference value identifying a correct value for the result of the test round when the operation unit is operating under the predetermined range of operating conditions. The operation unit is further adapted to receive a disable signal to disable the operation unit from performing the circuit operation when the result of the test round does not match the reference value.

BRIEF DESCRIPTION OF THE DRAWINGS

The subject matter regarded as the invention is particularly pointed out and distinctly claimed in the concluding portion of the specification. The invention, however, may be further understood by reference to the following detailed description read with reference to the accompanying drawings.

FIG. 4 is a diagram illustrating an embodiment of a method to verify circuit operating conditions.

FIG. 5 is a diagram illustrating an embodiment of a method to verify short-term consistency among clock periods to a circuit.

DETAILED DESCRIPTION

Figure 1:
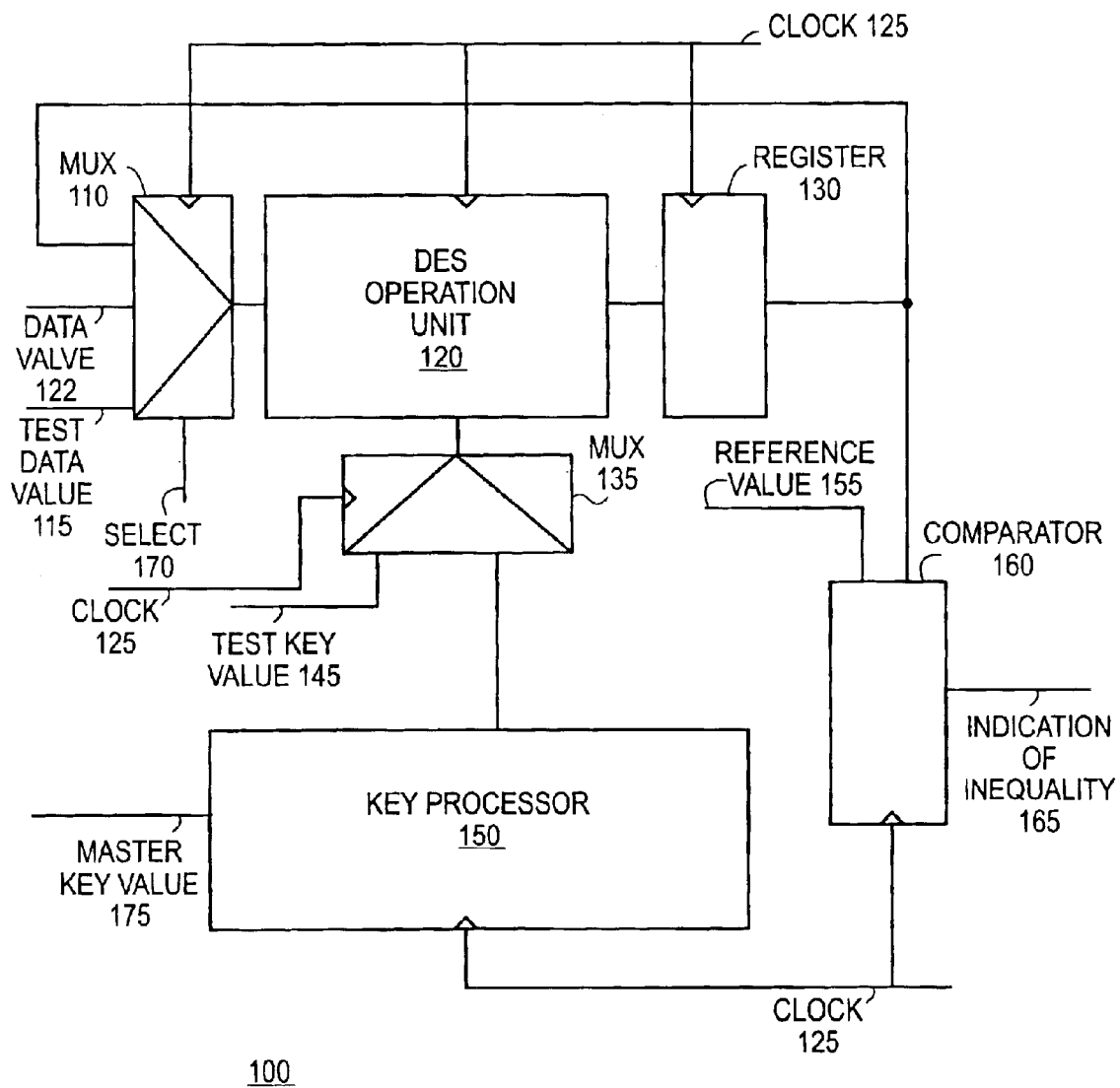
FIG. 1 is a schematic diagram illustrating an embodiment of a circuit to verify circuit operating conditions.

The embodiments described herein enable an advantageous verification circuit. For example, some embodiments may be implemented to verify both long-term operation conditions of a circuit and cycle-by-cycle variations in clock period. The embodiments described herein are merely illustrative, and one skilled in the art will appreciate that numerous modifications can be made which nonetheless fall within the scope of the present invention.

TABLE 1 shows the intermediate and final results of a DES operation under both normal conditions and conditions in which the operating conditions of the DES circuit have been altered beyond the circuit's normal operating range. The table results assume a two-stage DES unit capable of performing two rounds of DES processing per clock signal.

TABLE 1

| Clock Signal | Data Input Signal to DES Unit | Output Signal Should Be | Output Signal Is |
| --- | --- | --- | --- |
| 1 | data value | 2 round | undefined |
| 2 | undefined | 4 rounds | 2 rounds |
| 3 | 2 rounds | 6 rounds | undefined |
| 4 | undefined | 8 rounds | 4 rounds |
| 5 | 4 rounds | 10 rounds | undefined |
| 6 | undefined | 12 rounds | 6 rounds |
| 7 | 6 rounds | 14 rounds | undefined |
| 8 | undefined | 16 rounds | 8 rounds |

During Clock 1, a data value is applied to the DES unit. Under normal operating conditions, the multistage DES unit performs two rounds of DES processing during a single clock cycle. However, because the operating conditions have been varied (for example, by decreasing the operating voltage, increasing the operating temperature, or increasing the circuit clock frequency), the DES unit is unable to complete two rounds of DES processing, and the output signal of the DES unit is undefined at the end of the clock period. During Clock 2, the DES unit inputs the output signal produced by the previous round of processing, which is an undefined value. The DES unit performs another two rounds of processing. After the second clock period expires, the output signal of the DES unit is the result of two rounds of processing, because the DES unit has now had sufficient time under the impeded conditions to complete what should have taken a single clock period under normal conditions. During Clock 3, the intermediate result of two rounds of processing is input to the DES unit, and after Clock 4 the output signal of the DES unit reflects four rounds of processing. However, at this time the output signal would have reflected eight rounds of DES processing under normal conditions. After eight clock periods, when the DES operation would normally be complete, the final output signal(the output signal which may be propagated to the output pins of the DES unit) reflects only eight rounds of DES processing; an intermediate result which may yield clues to the value of the DES operation key, for example.

To make it more difficult for third parties to coerce an intermediate result from a DES operation unit, an advantageous circuit may be employed to help detect when the DES unit is operating outside of its predetermined operating range. In one embodiment a DES operation unit inputs two test signals. Processing is performed on these signals and a test output signal is computed. The test output signal may be compared with a stored reference value, the stored reference value being the output signal which the unit should have produced in response to the test signals under normal operating conditions. An indication of equality or inequality between the values may then be produced. An indication of inequality may indicate a variation in the normal operating conditions of the circuit. The circuit may be disabled from further processing upon detection of this situation. Of course, the invention is in no way limited to operation units performing DES; any computational circuit for performing multi-round processing on an input signal may benefit from application of the present invention.

One embodiment of the invention may be useful as a form of tamper protection when, for example, the circuit is to perform a secure operation, such as multiple rounds of DES encoding or decoding. For example, the embodiment may be used to disable the DES circuit from further processing when a third party alters the circuit's operating conditions in an attempt to cause the circuit to output intermediate values of the DES operation.

Referring now to FIG. 1, a schematic diagram illustrating an embodiment 100 of a circuit to verify operating conditions is shown. The embodiment 100 comprises a DES key processor 150 and a DES operation unit 120, although the invention is in no way limited to DES circuits. Those skilled in the art will appreciate that a DES operation may be performed by this circuit by inputting to the key processor 150 a master key signal 175. A variation 140 of the master key signal 175 may be produced by the key processor 150 for each of the sixteen rounds of a DES operation. The DES operation unit 120 may input master key variation signals 140 as well as eight bytes of data to encode 122 during each round of processing. After each round of processing, an intermediate output signal may be produced and stored in register 130 for possible application to the next round of processing. The resulting signal after sixteen rounds of processing is output from the DES operation unit 120 as the final result signal of the DES operation.

In this embodiment multiplexer 110 (a selector circuit) selects as a first input signal to DES unit 120 one of a data signal input 122, a test data signal input 115, and the previous output signal of DES operation unit 120. The output signal produced by key processor 150 is coupled to an input of multiplexer 135. Multiplexer 135 selects between the output signal of key processor 150 and a test key signal 145 as a second input signal to DES operation unit 120. Selecting the output signal of DES operation unit 120 as an input to DES unit 120 provides a feedback loop by which previous intermediate result signals may be provided as input signals to subsequent rounds of DES processing. In this embodiment DES operation unit 120 and key processor 150 may operate synchronously by sharing a common clock signal, and may perform a single round of DES processing per clock cycle. Of course, in an alternate embodiment DES operation unit 120 may comprise multiple stages of processing and may perform multiple rounds of DES processing per clock cycle.

During a first clock cycle, multiplexer 110 may select the test data signal 115 and multiplexer 135 may select the test key signal 145 as input signals to DES operation unit 120. DES operation unit 120 may operate on these signals and produces a test output signal in register 130, which is compared with reference output value 155 by comparator 160. The reference output value 155 may represent the expected result of a number of rounds of DES processing on the test data signal 122 and test key signal 145. If the values are unequal, an error indication may be produced to disable DES unit 120 from further processing. Otherwise, on a second clock cycle multiplexer 110 may select the data signal 122 and multiplexer 135 may select key signal 140 representing the output signal of key processor 150 as inputs to DES operation unit 120. DES operation unit 120 performs processing on the input data signal 122 and key signal 140 and outputs to register 130 an intermediate result signal representing one round of DES processing. On subsequent clock cycles multiplexer 110 may select the output signal of DES operation unit 120 and multiplexer 135 may select the output signal of key processor 140 as inputs to DES operation unit 120. The output signal of DES operation unit 120 after conclusion of processing may represent the final result signal of the DES operation.

Register 130 coupled to an output port of DES operation unit 120 provides temporary storage for output values of DES unit 120 between clock signals. The output port of register 130 is coupled to multiplexer 110 and comparator 160. When test data signal 115 and test key signal 140 are selected to apply to DES operation unit 120, DES operation unit 120 computes a test output signal which is stored in register 130. Comparator 160 receives test output signal from register 130 upon occurrence of a subsequent clock signal and compares the test output signal with a reference value 155 applied to another input port of comparator. If the test output signal does not match the reference value 155, this may be an indication that the DES operation unit 120 is operating beyond its normal operating conditions. The DES operation unit 120 may be disabled in this circumstance by an indication of inequality signal produced by comparator 160.

As an example of an application of this circuit embodiment, consider what may occur when the frequency of the clock signal applied to DES operation unit 120 is increased beyond the maximum specified operating frequency of the DES unit 120. Referring to TABLE 1, after the first round of processing register 130 may contain an undefined value which may then be received by comparator 160. It is unlikely that this undefined value, not resulting from the signal of a completed computation by DES operation unit 120 on the test signal 122 and test key signal 145, will match reference value 155. Comparator 160 may then produce an indication of inequality which may be used to disable DES operation unit 120 from further processing.

Figure 2:
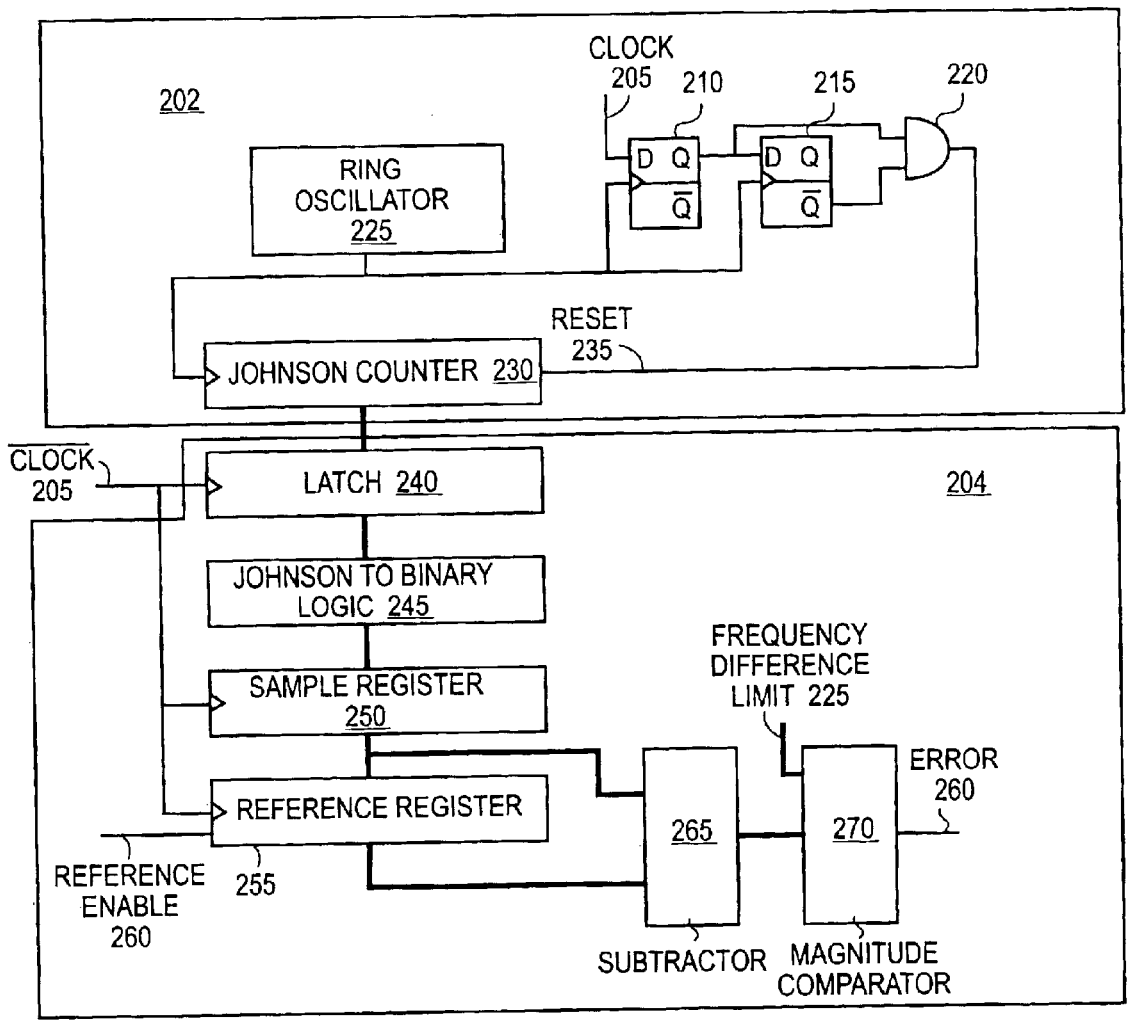
FIG. 2 is a schematic diagram illustrating an embodiment of a circuit to verify cycle-by-cycle circuit clock variations.

Referring now to FIG. 2, a schematic diagram is provided illustrating another embodiment 200 of a verification circuit, this embodiment to detect cycle-by-cycle clock signal variations. Whereas the embodiment 100 of FIG. 1 may be used to detect longer-term (multiple clock cycle) variations in operating conditions of a circuit, the embodiment 200 of FIG. 2 may be used to detect cycle-by-cycle variations in the clock signal period as applied to a circuit. Cycle-by-cycle clock frequency variations are another technique by which third parties may attempt to cause a circuit to output intermediate results of secure operations. Two units of the circuit embodiment 200 are a clock signal rate sampling unit 202 and an analytical unit 204.

In this embodiment, clock rate sampling unit 202 comprises ring oscillator 225, D flip-flops 210 and 215, AND gate 220, and Johnson counter 230. Numerous modifications and variations to this particular implementation will be apparent to those skilled in the art which nonetheless fall within the scope of the invention. For example, AND gate 220 may be replaced by other logic circuits performing a similar logical function.

Ring oscillator circuits are well known in the art and may be implemented using numerous designs. Although the invention is not limited to the use of ring oscillators, in one embodiment, ring oscillator 225 may be employed comprising an odd number of inverter stages coupled in series, with the output port of the final inverter stage coupled to the input port of the first inverter stage. In this embodiment the output signal of ring oscillator 225 may comprise the output signal of any of the inverter stages. The output signal of ring oscillator 225 may comprise an alternating sequence of binary 1's and 0's providing a high frequency clocking signal or timebase. In embodiment 200 the output signal of ring oscillator 225 may be supplied as a clock input signal to Johnson counter 230. Johnson counter 230 may increment a count value with each clock signal received from ring oscillator 225.

Johnson counter circuits are well known in the art and may be implemented using numerous designs.-Although the invention is not limited to the use of a Johnson counter, in one embodiment a Johnson counter 230 is employed comprising a shift register with the output signal of the final stage inverted and supplied as an input signal to the first stage. The count value output signal of Johnson counter 230 may be provided at output ports at each stage of the shift register, producing a sequence of binary 1's and O's signals which change by only a single bit with each increment of the count value.

In one embodiment, the output signal of ring oscillator 225 may be supplied as a clock input signal to D flip flops 210 and 215. The D input port of flip flop 210 is coupled to clock signal to verify 205 (not to be confused with the clock output signal produced by ring oscillator 225). D flip flops 210 and 215 may be coupled in such a way that output signal of AND gate 220 is asserted during a period of time during which clock signal 205 transitions from not asserted to asserted state. Output signal of AND gate 220, when asserted, provides a reset signal to Johnson counter 230.

Figure 3:
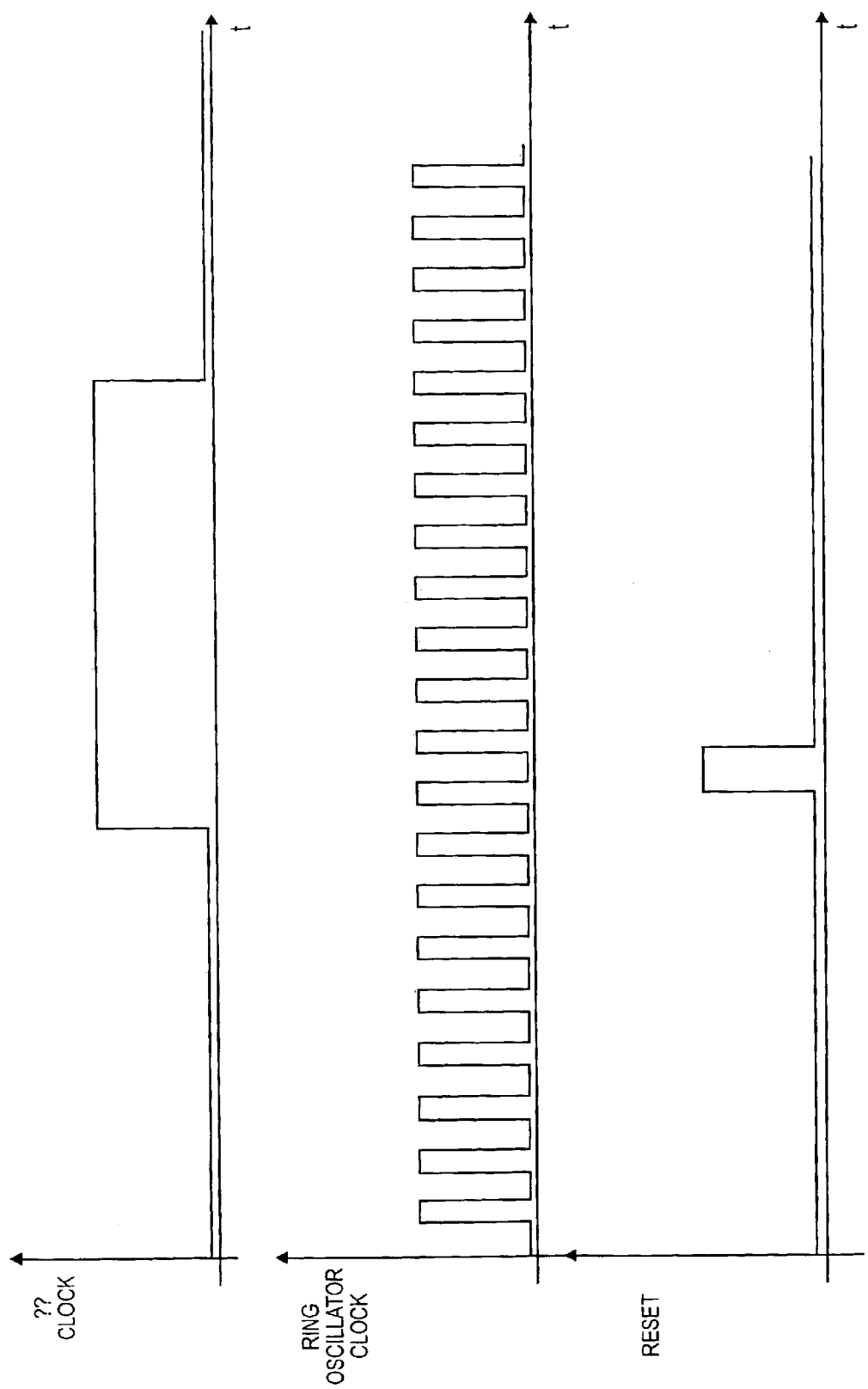
FIG. 3 is a timing diagram illustrating the timing of 1) a clock signal to verify, 2) an oscillator output signal, and 3) and AND gate output signal from FIG. 2.

FIG. 3 illustrates the timing of clock signal to verify 205, ring oscillator output signal 225, and AND gate output signal 220. AND gate output signal 220, providing reset signal to counter 230, is asserted for a period of time approximately equal to one period of ring oscillator output signal 225 during the transition of clock signal 205 from a non-asserted level to an asserted level. A result is that reset signal is asserted once during the period of clock signal 205 so that counter 230 counts clock signals from ring oscillator 225 for a full period of clock signal 205.

In one embodiment the frequency of the ring oscillator output signal is much greater than the frequency of clock signal 205 to verify. For example, if the frequency of ring oscillator output signal is 100 times greater than frequency of clock signal 205, counter 230 will produce a count value of approximately 100 between reset signals.

Referring back to FIG. 2, in one embodiment, analytical unit 204 comprises latch 240, Johnson to binary logic 245, sample register 250, reference register 255, subtractor 265 (a circuit to subtract two signals and output a difference signal) and magnitude comparator 270. Latch 240 samples output signal of counter 230 and passes the count signal to logic 245 to convert the Johnson count signal to a binary representation (such as, for example, a one or two's complement number). The converted signal may be stored in sample register 250. If the signal is to serve as a reference value for future comparisons, a reference enable signal 260 may be asserted to enable the count value to be output from sample register 250 to reference register 255. In one embodiment, the reference value may be a count value sampled during a first clock cycle of or immediately preceding an operation by a circuit, such as the DES operation circuit described previously. The signal output by sample register 250 may be subtracted by subtractor 265 from the signal output by reference register 255. The difference may be applied to magnitude comparator 270. Magnitude comparator 270 compares a difference in the values with a limit value 275 and produces an indication 280 when the difference exceeds the limit value. The indication 280 may be an indication that the clock signal 205 is being varied on a cycle-by-cycle basis, and the indication may be used to disable the circuit supplied by clock signal 205.

Referring now to FIG. 4, a diagram illustrating an embodiment 400 of a method to verify circuit operating conditions is shown. During a first clock cycle CLOCK 0, a test data signal is selected at 410 and a test key signal is selected at 420 to apply to a circuit (a DES operation circuit in one embodiment). A number N of rounds of a secure operation, such as a DES operation, is performed at 430, where N is a positive integer. A result of these N rounds of operation is stored at 440.

During a second clock cycle CLOCK 1, which may but is not required to immediately follow first clock cycle CLOCK 0, the test result is compared with a reference value at 450. An indication of the equality of the test value and reference value is output 460. Also during CLOCK 1, a first round of processing may be performed by the circuit by selecting a data value for input 470, selecting a key value for input 480, and processing N rounds of an operation on the data and key values 490. However, if the test result does not compare equally with the reference value, the output indication of inequality may be used to disable the circuit from further processing.

If the test output and reference signals were equal, it may be an indication that the circuit is operating within normal operating conditions. The circuit may then proceed during a third clock cycle CLOCK 2 to process further rounds of the operation, for example in one embodiment by selecting the output signal from the previous N rounds of processing as a next input signal at 415. A key value signal to apply this next input may also be selected at 425. The circuit may then process a next N rounds of the operation at 435.

Referring now to FIG. 5, an embodiment of a method 500 to verify short-term consistency among clock signals to a circuit is shown. During an initial clock cycle CLOCK 0, a count value corresponding to a period of CLOCK 0 is computed at 510 and stored at 520 in a reference register. CLOCK 0 may in some embodiments correspond to CLOCK 0 in FIG. 4 such that computation and storage of the count as in FIG. 5 may occur in parallel with computation of the test value as shown in FIG. 4. During a second clock period CLOCK 1 which may be the next clock period following CLOCK 0, or any clock period during a circuit operation, a count value corresponding to the period of CLOCK 1 is computed at 530. This count value may be subtracted at 540 from the value stored in the reference register during CLOCK 0. The absolute difference may be compared at 550 with a limit value, and if the difference exceeds a limit value, an output indication signal to this effect-produced 560.

The output indication may be used to disable the circuit from further processing when the clock period is varied beyond threshold limits during a circuit operation.

In summary, embodiments of an advantageous verification circuit have been disclosed. In one embodiment, operating conditions of a circuit may be verified by comparing the result signal of processing on test input signals with a reference value expected to be produced by the circuit for the test input signals. In another embodiment, cycle-by-cycle various in clock frequency may be detected by producing a count value for a first clock cycle and comparing with a count value produced for subsequent clock cycles.

While certain features of the invention have been illustrated as described herein, many modifications, substitutions, changes and equivalents will now occur to those skilled in the art. It is, therefore, to be understood that the appended claims are intended to cover all such embodiments and changes as fall within the true spirit of the invention.

What is claimed is:

1. A circuit comprising:
    a DES operation unit adapted to perform a circuit operation in a plurality of rounds per clock cycle, the DES operation unit to operate properly under a predetermined range of operating conditions and not to operate if the operating conditions are altered beyond the predetermined range, the DES operation unit adapted to select between receiving an input signal and a test signal and to perform a test round per clock cycle of the circuit operation when the test signal is selected;
    the circuit adapted to compare a reference value with a result of the test round per clock cycle, the reference value identifying a correct value for the result of the test round per clock cycle when the DES operation unit is operating under the predetermined range of operating conditions; and
    the DES operation unit further adapted to receive a disable signal to disable the operation unit from performing the circuit operation when the operating conditions of the operating unit have been altered beyond the predetermined range, the disable signal produced when the result of the test round per clock cycle does not match the reference value;
    wherein the operating conditions include at least one of an operating temperature, an operating voltage or an operating clock frequency.

2. The circuit of claim 1 in which the circuit operation comprises one of an encryption or decryption operation.

3. The circuit of claim 1 in which the operation unit is further adapted to receive a test key signal and to perform the test round applying the test key signal and the test signal in response to a first clock signal, the circuit adapted to compare the reference value with the result of the test round in response to a subsequent clock signal, the operation unit adapted to select the input signal and perform a first round of the plurality of rounds of the circuit operation applying the input signal in response to the subsequent clock signal.

4. A method comprising:
    selecting a test signal to apply to a test round per dock cycle of a circuit operation performing DES, the circuit operation comprising a plurality of rounds per clock cycle;
    comparing a result of the test round per clock cycle with a stored reference value, the stored reference value identifying a correct value for the result of the test round per clock cycle when the circuit is operating under a predetermined range of operating conditions; and
    producing a disable signal to disable the operation unit from performing the circuit operation when the result of the test round per clock cycle does not match the reference value and when operating conditions of the circuit have been altered beyond the predetermined range of operating conditions;
    wherein the operating conditions include at least one of an operating temperature, an operating voltage or an operating clock frequency.

5. The method of claim 4 in which selecting the test signal further comprises:
    selecting the test signal and a test key signal to perform one of an encryption or decryption operation by applying the test key signal to the test signal.

6. The method of claim 4 in which in which selecting the test signal further comprises:
    selecting the test signal and a test key signal; and
    performing the test round applying the test key signal and the test signal in response to a first clock signal.

7. The method of claim 4 in which comparing the result of the test round with a stored reference value further comprises:
    selecting an input signal in response to a subsequent clock signal; and
    comparing the result of the test round with a stored reference value in response to a subsequent clock signal and performing a first round of the plurality of rounds of the circuit operation in response to the subsequent clock signal.

8. A circuit comprising:
    a sampling unit to produce a measure of a first frequency of a clock signal applied to the circuit that performs DES operations, wherein the DES operations produce test rounds per clock cycle;
    a memory to store the measure of the first frequency; and
    an analytical unit to compare the measure of the first frequency with a measure of a second frequency of the clock signal applied to the circuit producing the test round per clock cycle, the analytical unit adapted to produce a disable signal to disable the circuit when a difference, between the measure of first frequency and the measure of the second frequency exceeds a threshold value when operating conditions of the circuit have been altered beyond a predetermined range; and an oscillator adapted to produce a frequency greater than the first and second frequencies of the clock signal;

wherein the operating conditions include at least one of an operating temperature, an operating voltage or an operating clock frequency.

9. The circuit of claim 8 in which the sampling unit further comprises:

a counter to count a number of oscillations of the oscillator during a period of the clock signal.

10. The circuit of claim 9 in which the counter comprises a Johnson counter.

11. The circuit of claim 9 in which the analytical unit further comprises:

a subtractor to determine the difference between the measure of first frequency an d the measure of the second frequency.

12. The circuit of claim 11 in which the analytical unit further comprises:

a magnitude comparator to receive the difference between the measure of the first frequency and the measure of the second frequency and to produce the disable signal when the difference exceeds a threshold value.

13. A method comprising:

sampling a clock signal applied to a circuit to produce a first frequency sample, wherein the circuit performs DES operations, the DES operations are produced in test rounds per clock cycle;

storing the first frequency sample;

again sampling the clock signal to produce a second frequency sample;

comparing the first frequency sample with the second frequency sample of the circuit that produced the test round per clock cycle;

producing a disable signal to disable the circuit when the difference between the first frequency sample and the second frequency sample exceeds a threshold value when operating conditions of the circuit have been altered beyond a predetermined range; and producing an oscillation comprising a frequency greater than the frequency of the clock signal;

wherein the operating conditions include at least one of an operating temperature, an operating voltage or an operating clock frequency.

14. The method of claim 13 further comprising:

counting a number of oscillations during a period of the clock signal.

15. The method of claim 13 in which sampling the clock signal further comprises:

producing the first frequency sample during the clock signal when applied to the circuit at a circuit operation; and producing the second frequency sample during the clock signal when applied to the circuit during the circuit operation.

* * * * *